May 4, 1954
H. BELAND
2,677,365
FOOD SERVING APPARATUS
Filed Jan. 16, 1952
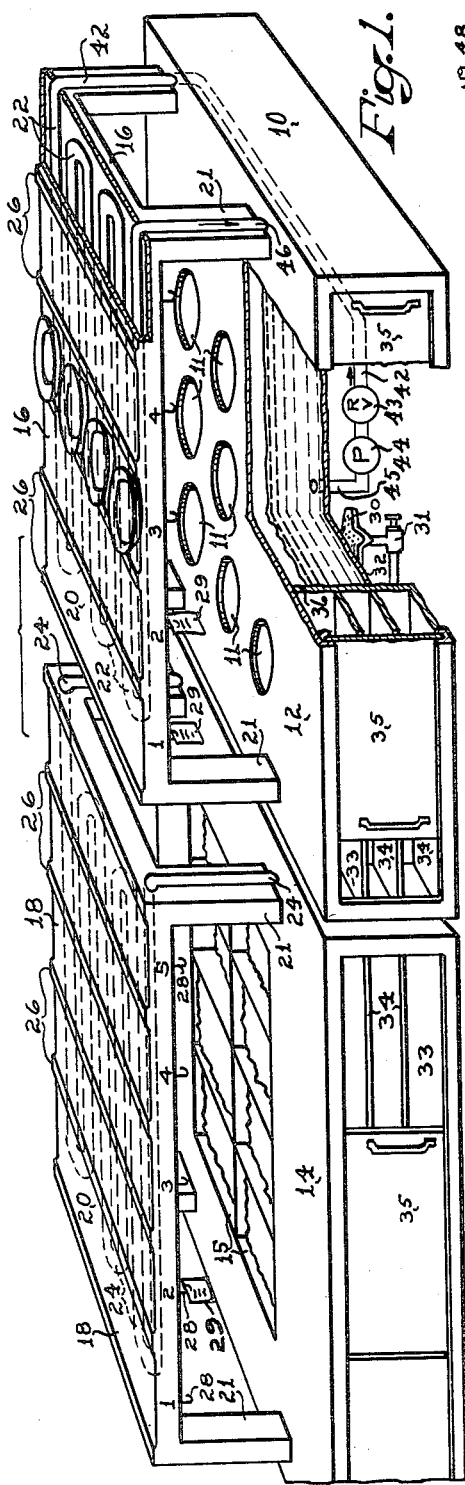
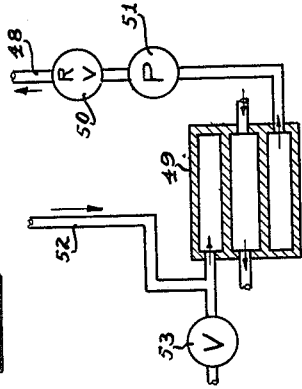
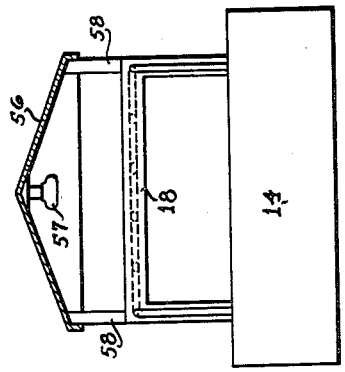
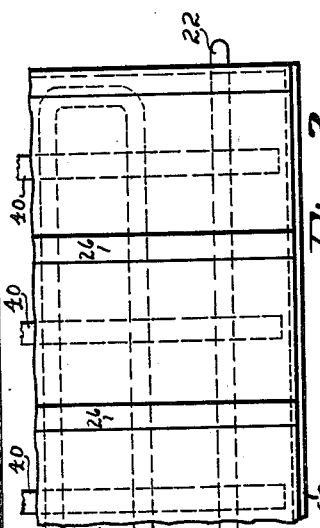
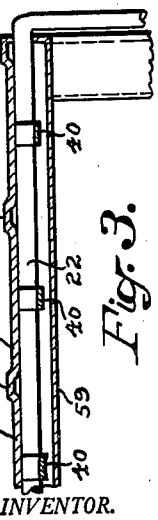
INVENTOR.
Henry Beland
BY
Clayton L. Jenks Patented May 4, 1954

2,677,365

UNITED STATES PATENT OFFICE 2,677,365

FOOD SERVING APPARATUS

Henry Beland, Auburn, Mass.

Application January 16, 1952, Serial No. 266,746

4 Claims. (Cl. 126—33)

This invention relates to food serving apparatus for a restaurant.

In the kitchens of the larger sized restaurants, there is usually a steam or hot water bath, known as a steam table, for keeping pots of food hot. There may be a wooden shelf associated with the table on which the chef and his assistants place the dishes of food taken from those pots as well as from the pans of roast or other types of meat. Each waitress brings her written orders directly to the chef, or to a checker who sees that the food supplied corresponds with the original order. Then she goes about other duties and ultimately returns for her serving. Several orders may be presented to the chef at about the same time, but he cannot fill them until the respective waitresses are ready to receive the dishes because the food would quickly cool and become un-servable if allowed to stand. Consequently, the orders accumulate while the chef idly waits for the waitresses to return. Often several show up at the same time, and they may stand there urging the kitchen attendants to speed up their orders. This irritates the chef and causes confusion. Often the delay causes one waitress to deliberately take the order of another for her own customer. This and other like problems arise from the fact that the chef should not place the food on the dish until the waitress is ready to carry it away, and that is a bottleneck which prevents efficient and speedy service.

In accordance with my invention, I have provided a shelf, table or plate, herein termed a serving table, which is associated primarily with and located above the steam or a corresponding cold table and is maintained at a controlled temperature so that dishes of food placed thereon may be kept satisfactory for the several minutes often required before the waitress is ready for them. In this way, the chef may fill the orders progressively and without delay or he may even prepare many dishes in advance of the orders and keep them in satisfactory condition for serving.

As a further development of this invention, the serving table, or a group of the same, is so constructed and arranged that each waitress has a special station reserved solely for the food dishes which she requires. When she hands in an order, it is placed on a hook or otherwise associated with her particular station, and the chef will then fill the order as time permits and place the dish of food on that portion of the serving table which represents her particular station. Each waitress therefore merely watches to see what orders have been filled and deposited at her station. In this way, the chef is not excited or irritated by the impatient demands of the waitresses, and he is able to fill the orders progressively and continuously, and the food will be kept in a satisfactory condition. For example, a slice of roast beef will turn gray and become unappetizing at least in appearance within a very few minutes after it is cut unless special precautions are taken. Under the new plan, the roast beef may be cut cold and the slice laid directly on the hot plate of the serving table at the right station and thus be brought to a satisfactory temperature just before it is to be placed on the ceramic dish.

This new system of serving food requires a close association between the steam bath for the pots of food and with a heated storage cabinet for the serving plates so that the food may be placed on a warm serving plate or dish and the latter then placed immediately in the correct serving table station where the food will be maintained at a suitable temperature for the required length of time. A hot serving table is preferably heated by a circulating fluid, such as hot water, maintained at a correct temperature, and that water may be supplied either from an outside heating unit or preferably in a direct relation with the heating water used in the bath which maintains the temperature of the pots of food. Similarly, a cold serving table is closely associated with a cold water bath arranged to keep salads and other foods at a required low temperature, and this table prevents the salad or other plate from warming too rapidly.

A preferred embodiment of this invention is illustrated in the accompanying drawings in which:

Fig. 1 is a perspective view, partly broken away and in distorted proportions, which shows two separate cold and hot food serving tables mounted over associated hot and cold water baths, and wherein the hot serving table is heated by water supplied from the hot water bath;

Fig. 2 is a fragmentary top plan view of the heated serving table;

Fig. 3 is a fragmentary vertical section of the same table;

Fig. 4 is a fragmentary sectional view taken at right angles to Fig. 3;

Fig. 5 is an end elevation of the cold water bath and serving table having a hood and a bacteria destroying light thereover; and Fig. 6 is a modification showing a hot water supply system independent of the water bath.

As shown in Fig. 1, the apparatus comprises a heat exchange tank 10, customarily called a steam table, having openings 11 in its top horizontal flat plate 12. The edges of these openings are arranged for supporting pots of food, whereby the food may be kept at a constant temperature by steam or hot water within the tank. A second tank 14 may contain cold water and carry a series of horizontal trays 15 suitably supported over a central opening and arranged for keeping at a cold temperature such perishable foods as salads and the like.

My invention comprises a heat exchange serving table 16 supported over the steam table 10 for keeping plates of food warm, and, if desired, a second heat exchange serving table 18 supported over the cold water bath 14 for cooling other food dishes. Each of the upper tables 16 and 18 has a top flat plate 20 made of Monel metal or other suitable heat interchanging material, and the table is mounted on legs 21 supported on the top plate of the tank therebeneath and is arranged for supporting a group of dishes carrying food thereon. In this embodiment the right hand metal serving table 16 is adapted to be heated by a heat exchange pipe 22 mounted beneath and arranged to transfer heat from a heating fluid to the metal plate 20 forming the table top. Likewise, the serving table 18 has a pipe 24 arranged to circulate cold water and maintain the plate thereabove at a desired temperature below that of the room.

The serving tables 16 and 18 are made sufficiently wide so that they may hold several dishes arranged in a row transversely of the table. In order to provide separate stations for the waitresses, the top plates of each table are shaped to form a set of low upstanding parallel ridges 26 between which are open ended flat surfaced channels or waitress stations for holding food dishes therein. These ridges are preferably spaced by substantially the width of the widest dish or plate used which will allow the dish to rest on the heat transfer plate 20 therebeneath. The ridge is also low enough so that if the edge of the dish rests against the side of the ridge it will not be lifted off the heat transfer plate. It is intended that each waitress shall have her station indicated by a name or a special number 1, 2, 3, 4, etc. and that she shall place her food order in a definite relation to her station so that the chef may see and fill the order and not make any mistake as to the station for which the food is intended. A convenient device for this purpose is a hook 28 secured on the under side of the table at each station and preferably arranged near the chef's side of the table and on which the waitress may hang her paper food check. The front of the view of Fig. 1 is the chef's side of the table. Each waitress has her station at the rear side of this table and she reaches beneath the table top to hang her check 29 on the hook where the chef may readily see it. Other suitable means may be provided for associating the check with her particular station. Thus, when the waitress has placed her order 29 on the hook 28 she may go about other business, and the chef at his convenience will fill the order and place it on one or both of the heat exchange plates 16 and 18 at the proper station indicated by the position of the food check. The chef leaves the check 29 on the hook so that the waitress may compare it with the dishes found on her table station. The sizes and structures of the heat exchange baths 10 and 14 and of the upper serving tables 16 and 18 and the number of stations thereon will of course depend upon the type and size of the restaurant and the number of waitresses used for the service.

The various details of this construction may be suitably modified depending upon the restaurant requirements. In the form illustrated, the lower steam bath 10 is a metal tank having the required bottom and side walls arranged to hold water that is suitably heated, such as by a gas burner 30 supplied by gas from the valved pipe 31 and located beneath the metal bottom plate 32 of the tank. Suitable provisions may be installed for insuring a reasonably constant temperature for this bath. Pots of food, such as vegetables, are supported on the rims of the openings 11 in the top plate 12 and may either be heated by steam or the vapor from the hot water or by direct contact with the water and thus held at a reasonably constant temperature, as required. The other bath for tank 14 is supplied with cold water from a suitable source, not shown, and the top plate and trays 15 are so arranged that the trays may be held in contact with the water and kept at a required constant temperature.

The front and rear portions of each lower heat exchange tank 10 or 14 may be provided with storage compartments 33 having shelves 34 arranged for supporting dishes and other equipment needed by the chef at his side of the apparatus and by the waitress at her side. Sliding doors 35 mounted in runways and other equipment may be provided to aid in maintaining the temperature that is derived by radiation from the vertical walls 36 defining a partition between the plate storage compartment and the tank side, so that the plates will be kept at a hot or cold temperature approaching that of the water bath within the related tank.

Various constructional features may be adopted to insure an adequate heat exchange between the hot water pipes 22 and the associated heated serving table 16 and between the cold water pipes 24 and the salad serving table 18. In the form shown particularly in Figs. 2, 3 and 4 representing fragmentary plan and sectional views of the heating table 16, the pipe 22 may be a single pipe arranged in S-shaped convolutions beneath the table or otherwise shaped and mounted as required for the heat transfer. This pipe 22 is secured to the under side of the metal plate 20 in a close and heat exchanging relationship. The pipe or tube 22 may be made of copper, and it may be secured in position by means of copper bands 40 which pass transversely around the under side of each convolution of the copper tube 22 and laterally of the table in close contact therewith. These bands are soldered or welded to the under side of the metal plate 20 forming the top of the serving table, and the bands are preferably secured similarly to the tube 22 by a metal junction, such as solder, which provides for a rapid heat interchange. The bands 40 are shown narrow and few in number in the drawings for the sake of simplicity of illustration, but it is preferred that these bands be comparatively wide and spaced so that the heat is transferred very quickly from the fluid within the tube directly to the plate 20 thereabove. This same construction may be employed for securing the cold water pipe 24 to the under side of the cold table 18. For this cold table, the pipe 24 is connected directly with the cold water pressure supply system of the restaurant, and suitable valves and other mechanism are provided to insure an adequate flow of the cooling medium.

At the hot water side of the apparatus, the heating fluid for the pipe 22 may be derived either from the hot water tank of the steam table therebeneath or, as shown in Fig. 6, from a separate heating system. In the Fig. 1 construction, a pipe 42, provided with a suitable pressure regulating valve 43, is connected through an electric motor driven pump 44 with a pipe 45 connecting into the tank, and a further pipe 46 provides for a return flow of the hot water from the coil 22 to the lower tank. In the construction of Fig. 6, a pipe 48 connecting with the right hand leg 42 (Fig. 1) of the heating system of the upper serving table receives hot water from a separate steam or hot water furnace boiler 49 employed to heat the building or solely for the purpose of heating this table. The boiler 49 (Fig. 6) may comprise a standard heat exchange apparatus, such as a separate water coil immersed in the boiler water, and the pipe 48 is a separate take-off from the heating coil which supplies the heating water to the upper table 20. This pipe 48 may have a pressure regulating valve 50, and the water is circulated by a suitable electric motor driven pump 51. The return flow down pipe 46 (Fig. 1) connects with the return pipe 52 of this system, and a suitable water supply may be introduced through the valved pipe 53, as is well understood.

As shown in Fig. 5, the tank 14, for example, may have its table 18 covered by a gabled hood 56 carrying in its peak a depending electric lamp 57 arranged to project an ultra violet or other suitable ray of light against the salads and other foods stored therebeneath for the purpose of inhibiting bacteria action. This light is preferably so constituted that it does not impart a material degree of heat to the food, since excessive heat from the lamp would tend to dry out the food and injure it. It will be understood that the hood 56 or other form of roof may be mounted over the upper serving table of both the heating and cooling plates 16 and 18 and that the supporting legs 58 for this hood will be of a required height to provide access beneath this roof-like structure but yet limit the radiation of heat to or from the plate 18 or 20 so that the food stored on this upper serving table will be maintained in a satisfactory condition for a considerable time.

It will be appreciated that the sizes and arrangements of this construction will be made to suit the convenience of both the chef and the waitresses. The table legs 21 supporting the plates 18 and 20 are sufficiently high so that both operators may reach beneath the upper serving table to get at the food in the pots and trays stored on the lower water bath. The table may be provided with a bottom 59 below the water pipe and sides forming an enclosure which helps to maintain the desired temperature in the plate above the pipe and suitably insulates the pipe and guards it from contact with the users of the apparatus. The length of each channel between the ribs 26 forming the waitress' station is extensive enough to hold several dishes, such as three or more. This station, whether delineated by the ridges or other marking or separating means serves to isolate a group of food dishes or at least to identify them as being associated with a given waitress station. The front edge of the heated table 20 may be provided with a guard rail or strip of wood or asbestos 60 at each end of the delineating station (Fig. 2) which prevents the operator's arm from contacting with the edge of the hot plate 20. Other provisions may be made for the sake of safety.

As above indicated, the waitress hangs her order slip on the hook 29 and either she or the chef fills the smaller side dishes or the main plate or dish, in part, from the pots and trays supported over the lower heating and cooling tanks and then stores these on the upper table in the location represented by the number assigned to a given waitress station. The chef prepares his order of meat and vegetables and places the dish or plate in that same station. Then, when the waitress returns from her other duties she finds her food not only ready for her but maintained at a suitable temperature.

It will now be appreciated that the association of a heating or cooling plate with a waitress station for the required food dishes has provided a new method of restaurant operation which has heretofore been unattainable. The chef may proceed now in an orderly manner to fill the various orders left by the waitresses, and no waitress has to stand around waiting in turn for her order to be filled. Her instructions to the chef are given solely through the written order check which she hangs on the hook 28. The upper hot plate 20 may be maintained at 160° F. or other temperature deemed best, and similarly the cold plate 18 may be maintained at a suitable temperature, such as that of the cold water with which the restaurant is supplied. This results from the fact that the straps or U-shaped bands 40 which extend partly around and support the water pipe integrally serve to transmit the heat and are adequate to maintain the upper plate at substantially the temperature of the fluid circulated medium. It will also be appreciated that the upper heated food storage plate is maintained at a uniform temperature without drying out the food as would result if a heated Globar unit, for example, were placed above the food and arranged to radiate its rays directly onto the food. Since the heat comes up through the serving plate or dish, the top of the food remains in contact with the air of normal room temperature and will not dry out. Other advantages will be readily apparent to one familiar with restaurant practices.

It will be understood that the above disclosure of preferred embodiments of this invention is not to be interpreted as imposing limitations on the appended claims and that various modifications may be made within their scope.

I claim:

1. Restaurant apparatus for storing and serving food comprising a tank for heat exchange fluid having a horizontal top provided with a set of spaced openings and heat exchanging food containers supported in said openings, a serving table having a fully exposed, horizontal top plate of heat exchanging metal supported over and spaced widely from the top of the tank to provide access to the containers, said plate having spaced parallel means thereon which delineate a series of serving stations extending transversely of and readily accessible from both sides of the table top plate, said plate at each station being arranged to store and to maintain heat exchange contact with a plurality of standard restaurant dishes and being flat and unobstructed at a side edge so that the stored dishes may be readily slid along and removed from the station, means associated with each station and accessible from both sides of the table for displaying a food order to be filled therefor, a heat exchange metal pipe, metallic means for securing the pipe to the under side of the table top plate which provides an extensive heat conduction thereto, and means for circulating heat exchanging fluid through the pipe and thus providing a substantially constant temperature plate for supporting the food dishes at each station.

2. Restaurant apparatus for storing and serving food comprising a tank for heat exchange fluid having a horizontal top provided with a set of spaced openings and heat exchanging food containers supported in said openings, a serving table having a continuous, non-perforate, fully exposed, horizontal top plate of heat exchanging metal supported on said tank, parallel spaced ribs on said plate extending only transversely and forming a series of shallow channels wider than the standard restaurant dishes and longer than a plurality thereof which constitute individual, readily accessible serving stations capable of storing a plurality of dishes simultaneously and of identifying the dishes with an associated order, each channel having a flat unobstructed surface extending the entire width of the table and readily accessible from both ends which provides for storing and slidably removing the dishes therefrom, said ribs being low and shaped to prevent lifting a dish from heat exchange contact with the plate, a heat exchange metal pipe, metallic means for securing the pipe to the under side of the plate which provides an extensive heat conduction thereto, and means for circulating heat exchanging fluid through the pipe at a controlled temperature and thus providing a substantially constant temperature plate for supporting the food dishes at each station.

3. Apparatus according to claim 2 comprising an edging of low heat conductivity on the plate located at the end of each channel and continuous with the flat surface thereof which prevents contact with the edge of the heat exchange plate.

4. Apparatus according to claim 2, in which the heat exchange pipe is U-shaped and extends transversely beneath the channel stations, and comprising a set of wide metal bands integrally connected by metal with the under side of the table and partly surrounding and supporting the pipe and having extensive heat exchange contact therewith, and a guard which encloses and prevents accidental contact with the pipe.

References Cited in the file of this patent

UNITED STATES PATENTS

| Number | Name | Date |
|---|---|---|
| 6,646 | Hill | Aug. 14, 1849 |
| 46,491 | Patrick | Feb. 21, 1865 |
| 730,748 | Dickson | June 9, 1903 |
| 1,044,525 | Herzog | Nov. 19, 1912 |
| 1,697,472 | Peron | Jan. 1, 1929 |
| 1,800,863 | Johnson | Apr. 14, 1931 |
| 1,948,425 | Mayberry | Feb. 20, 1934 |

FOREIGN PATENTS

| Number | Country | Date |
|---|---|---|
| 9,963 | Switzerland | July 8, 1899 |